United States Patent
Hantman

(10) Patent No.: US 11,553,729 B1
(45) Date of Patent: Jan. 17, 2023

(54) NON-CHEMICAL NAMED, SALTINESS ENHANCING MIXTURE FOR USE IN KETCHUP AND OTHER FOODS, DESIGNED FOR MARKETING

(71) Applicant: Ken Hantman, Huntingdon Valley, PA (US)

(72) Inventor: Ken Hantman, Huntingdon Valley, PA (US)

( * ) Notice: Subject to any disclaimer, the term of this patent is extended or adjusted under 35 U.S.C. 154(b) by 0 days.

(21) Appl. No.: 16/517,238

(22) Filed: Jul. 19, 2019

Related U.S. Application Data

(63) Continuation-in-part of application No. 14/753,167, filed on Jun. 29, 2015, now abandoned, and a continuation-in-part of application No. 61/998,804, filed on Jul. 9, 2014.

(51) Int. Cl.
| | |
|---|---|
| *A23L 27/40* | (2016.01) |
| *A23L 27/16* | (2016.01) |
| *A23L 27/00* | (2016.01) |
| *A23L 27/10* | (2016.01) |
| *A23L 27/60* | (2016.01) |

(52) U.S. Cl.
CPC ............ *A23L 27/45* (2016.08); *A23L 27/105* (2016.08); *A23L 27/16* (2016.08); *A23L 27/63* (2016.08); *A23L 27/88* (2016.08)

(58) Field of Classification Search
CPC ........ A23L 27/105; A23L 27/16; A23L 27/40; A23L 27/45; A23L 27/63; A23L 27/88
USPC ........................................................ 426/589
See application file for complete search history.

(56) References Cited

U.S. PATENT DOCUMENTS

| | | | |
|---|---|---|---|
| 3,756,833 A * | 9/1973 | Powell ................. | A23L 27/105 426/638 |
| 4,451,494 A | 5/1984 | Roan, III | |
| 4,473,595 A | 9/1984 | Tilkian | |
| 4,556,567 A | 12/1985 | Meyer | |
| 4,556,568 A | 12/1985 | Meyer | |
| 4,556,577 A | 12/1985 | Meyer | |
| 4,556,578 A | 12/1985 | Meyer | |
| 4,560,574 A | 12/1985 | Meyer | |
| 4,734,290 A | 3/1988 | Meyer | |
| 4,963,387 A | 10/1990 | Tanaka | |
| 5,207,800 A | 5/1993 | Moore | |
| 5,213,838 A | 5/1993 | Sheikh | |
| 6,743,461 B1 | 6/2004 | Vasquez | |
| 7,923,047 B2 | 4/2011 | Jensen et al. | |
| 8,900,650 B1 | 12/2014 | Wang et al. | |
| 2006/0286275 A1* | 12/2006 | Salemme ................. | A23L 27/40 426/649 |
| 2011/0097449 A1 | 4/2011 | Jensen et al. | |

OTHER PUBLICATIONS

Converting recipes to metric measures—pp. 5—converting_recipes_to_metric_measures.pdf (Year: 2018).*
(http://www.unilever.com/sustainable-living/nutrition-health/making-our-products-healthier/reducing-salt). Improving_nutrition_Sustainable_Living_Unilever_website.pdf.
(http://en.wikipedia.org/wiki/Taste). Taste_Wikipedia.pdf.
(https://www.unilever.com/about/innovation/open-innovation/challenges-and-wants/less-salt.html) Less_Salt_About_Unilver_website.pdf.
(Joe Ames "Low sait non-sweet Thai recipes", recipilink.com, Jan. 6, 1997, 5 pages, pg. 1) https://www.recipelink.com/msgbrd/board_0/1997/JAN/435.html Recipe_Salt_Substitutes_Recipelink.pdf.
(http:/emerils.com/125947baby-bam; 2 pgs; https:/web.archive.org/web20140617081104http://emerils.com/125947/baby-bam.) Baby_Bam_Emerils.pdf.
(https://www.accessdata.fda.gov/scripts/cdrh/cfdocs/cfcfr/CFRSearch.cfm?fr=155.194) CFR_Code_Federal_Regulations_Title_21.pdf.
(Easy Homemade Ketchup By Karen Sorenson, May 30, 2014; 5 pages; http://holistically engineered.com/2014/05/easy-homemade-ketchup.html) Easy_Homemade_Ketchup_Paleo.pdf.
Daddyo's Raisin Tomato Ketchup, Jan. 29, 2012; 3 pgs. http//www.inthecupboard.com/2012/01/29home-made-raisin-tomato-ketchup/) Daddyo's_Raisin_Tomato_Ketchup.pdf.
(https://www.heart.org/en/healthy-living/healthy-eating/eat-smart/sodium/sodium-and-salt?gclid=EAlalQobChMll563o9D44glVUMDlCh1n4girEAAYASAAEgKykvD_BwE#.Vz9W3-crJ0s) Get_the_Scoop_on_Sodium_and_Salt_American_Heart_Association Get_the_Scoop_on_Sodium_and_Salt_American_Heart_Association.pdf.
(Mandy Oaklander; Time Magazine; Oct. 22, 2015; https://time.com/4082532/dried-fruit-prunes-sugar-raisins/). Is_Dried_Fruit_Healthy_or_Just_a_Giant_Sugar_Bomb_Time.pdf.
https://www.fda.gov/food/food-ingredients-packaging/generally-recognized-safe-gras Generally_Recognized_as_Safe_(GRAS)_FDA.pdf.
(Foreign Language Translation of Chemical Nomenclature by Computer; Roger Sayle; J Chem Inf Model. Mar. 23, 2009; 49(3): 519-530. https://www.ncbi.nim.nih.gov/pmc/articles/PMC2659868/ Foreign_Language_Transiation_of_Chemica_Nomeclature_by_Computer.pdf.
(Foreign Language Translation of Chemical Nomenclature by Computer; Roger Sayle; J Chem Inf Model. Mar. 23, 2009; 49(3): 519-530. https://www.ncbi.nim.nih.gov/pmc/articles/PMC2659868/ Foreign_Language_Translation_of_Chemica_Nomenclature_by_Computer.pdf.
(https://www.webmd.com/vitamins/ai/ingredientmono-237/lysine) Lysine_Uses,_Side_Effects,_Interactions,_Dosage,_and_Warning.pdf.
(https://www.drugs.com/npc/lysine.html) Lysine_Uses,_Benents_&_Side_Effects_Drugs_com.pdf.
(Eugenia Killoran; "Are Salt Substitutes Safe?" https://www.pritikin.com/your-health/healthy-llving/eating-right/salt-substitutes-safe.html) Are_Salt_substitutes_safe_Pritikin.pdf.
https://ww.unilever.com/about/innovation/open-innovation/challenges-and-wants/less-salt.html) Less_Salt_About_Unilver_website.pdf.

(Continued)

*Primary Examiner* — Jyoti Chawla

(57) ABSTRACT

A saltiness enhancing mixture containing only non-chemical named ingredients generally recognized as safe which substantially reduces the typical amount of sodium per serving in many types of foods while yet preserving an equal level of perceived saltiness without introducing predominant spicy flavor and without adding bitter notes requiring more than typical levels of sweetener.

8 Claims, No Drawings

(56) References Cited

OTHER PUBLICATIONS (Joe Ames "Low salt non-sweet Thai recipes", recipilink.com, Jan. 6, 1997, 5 pages, p. 1) https://www.recipelink.com/msgbrd/board_0/1997/JAN/435.html Recipe_Salt_Substitutes_Recipelink.pdf.

(http:/emerils.com/125947baby-bam; 2 pgs; https://web.arthive.org/web20140617081104htp://emerils.com/125947/baby-bam.) Baby_Bam_Emerils.pdf.

(Mandy Oaklander; Time Magazine; Oct. 22, 2015; https://time.com/4082532/dried-fruit-prunes-sugar-raisins/). Is_Dried_Fruit_Healthy_or_Just_a_Giant_Sugar_Bomb_Time.pof.

https://www.fda.gov/food/food-ingredients-packaging/generally-recognized-safe-gras. Generally_Recognized_as_Safe_(GRAS)_FDA.pdf https://www.fda.gov/food/food-ingredients-packaging/generally-recognized-safe-gras.

(Foreign Language Tranalation of Chemical Nomenclature by Computer; Roger Sayle; J Chem Inf Model, Mar. 23, 2009; 49(3): 519-530, https://www.ncbi.nlm.nih.gov/pmc/articles/PMC2659868/Foreign_Language_Translation_of_Chemica_Nomenclature_by_Computer.pdf.

(https://www.webmd.com/vitamins/al/ingredientmono-237/lysine) Lysine_Uses,_Side_Effects,_Interactions_Dosage,_and_Warning-pdf.

(https://www.drugs.com/npc/lysine.html) Lysine_Uses,_Benefits_&_Side_Effects_Drugs_com.pdf.

(Eugenia Killoran; "Are Salt Substitutes Safe?" https://www.pritikin.com/your-health/healthy-living/eating-right/salt-substitutes-safe.html) Are_Salt_substitutes_safe_Pritikin.pdf.

Joe Ames "Low salt non sweet Thai recipes" (recipilink posting Jan. 6, 1997).

U.S. Food and Drug Administration Title 21; Section 101.12 "Reference Amounts Customarily Consumed per Easting Occassion".

* cited by examiner

NON-CHEMICAL NAMED, SALTINESS ENHANCING MIXTURE FOR USE IN KETCHUP AND OTHER FOODS, DESIGNED FOR MARKETING

CROSS-REFERENCE TO RELATED APPLICATIONS

This application is a Continuation-In-Part of and claims priority from non-provisional U.S. Ser. No. 14/753,167, filed Jun. 29, 2015, which itself claims priority from provisional U.S. Ser. No. 61/998,804 filed Jul. 9, 2014, the entireties of both of which are hereby incorporated by reference herein.

FEDERALLY SPONSORED RESEARCH

Not Applicable

SEQUENCE LISTING OF PROGRAM

Not Applicable

BACKGROUND OF THE INVENTION

Field of Invention

This invention relates to salt substitute mixtures or blends intended to lower sodium in foods. Classes 426/72; 426/649; and 426/97 were relevant.

Prior Art

Excess salt in diets accounts for 6300 deaths per day worldwide and is associated with one-intend deaths in the United States. The American Heart Association reports that if Americans cut their daily consumption from the present average of 3,400 mg. per day to not more than 2,300 mg. it would save 300,000 lives per year. The ideal amount they recommend for most adults is 1,500. Excess salt also contributes to early onset hypertension and to obesity in children. Even for people with no present hypertension excess salt has deleterious health effects and predisposes the development of hypertension.

Most of the excess salt consumed comes from salt in foods, predominantly pre-packaged or prepared foods, as opposed to added table salt. Yet 80% of people in a study of 6000 subjects eating this excess amount were unaware of or denied eating excess salt. (http://www.unilever.com/sustainable-living/nutrition-health/making-our-productshealthier/reducing-salt). Furthermore, the majority of people sampled said that less salt would make their food taste less palatable and they would not want that.

Another thing to recognize is that suggested serving sizes are just not realistic particularly on things like cookies, condiments, potato chips and so forth. People eat several times the suggested serving, so the 300 mg. of sodium becomes 900 mg. in a one or two minute eating experience.

Accordingly various salt substitutes have been patented to offer alternatives to straight salt, either replacing salt in whole or in part.

A sampling of prior art with reference to U.S. Pat. No.
U.S. Pat. No. 6,743,461 Salt substitute compositions
U.S. Pat. No. 5,213,838 Sodium-free salt substitute containing citrates and method for producing the same
U.S. Pat. No. 5,207,800 Low toxicity, biodegradable salt substitute for dyeing textiles: magnesium acetate in direct or reactive dyeing of cotton
U.S. Pat. No. 5,094,862Salt substitute granule and method of making same
U.S. Pat. No. 4,963,387Salt substitute and foodstuffs containing same
U.S. Pat. No. 4,734,290 Process for preparing a coated-particle salt substitute composition
U.S. Pat. No. 4,560,574Salt substitute containing potassium chloride, maltodextrin and sodium chloride and method of preparation
U.S. Pat. No. 4,556,578 NaCl-Free salt substitute containing potassium chloride, maltodextrin and potassium bitartrate and method of preparation
U.S. Pat. No. 4,556,577 Admixture of potassium chloride and maltodextrin as salt substitute and method of preparation
U.S. Pat. No. 4,556,568Salt substitute containing potassium chloride coated with a mixture including maltodextrin and potassium bitartrate and method of preparation
U.S. Pat. No. 4,556,567Salt substitute containing potassium chloride coated with maltodextrin and method of preparation
U.S. Pat. No. 4,556,566Salt substitute containing potassium chloride coated with a mixture of maltodextrin and sodium chloride and method of preparation
U.S. Pat. No. 4,473,595 Low-sodium salt substitute
U.S. Pat. No. 4,451,494 Sodium-free salt substitute
U.S. Pat. No. 4,243,691 Sodium-free salt substitute A review of these shows that the great majority utilize potassium chloride, and in all cases various chemicals. On a scale of 1 to 100, with salt scoring 100, potassium chloride scores 60 as an index of its perceived "saltiness" taste (http://en.wikipedia.org/wiki/Taste). The addition of 1 ppm thaumatin or the addition of L-lysine or fumaric acid or citric acid helps cut the bitter aftertaste of potassium chloride. Nevertheless, the general reaction of the public to such salt substitutes, garnered from reading reviews of such products on popular retailer Amazon's plentiful user reviews suggests that while reaction is generally positive it is coming from only a medically salt-restricted population, fully aware that they must accept some compromise. Furthermore at least twenty percent of reactions are moderately to highly negative. It must be noted that there are zero reactions saying the substitute is actually superior in taste to plain salt. There are as well various spice blend substitutes and the reactions to those are about equal to the potassium based ones in terms of perceived taste as a salt substitute.

While most people don't consume enough potassium it is plentifully available from natural sources. Also some people are on potassium restricted diets as well as sodium restricted, so the best substitute would contain no potassium chloride.

A review of the above cited patented prior art reveals that there are many undoubtedly ingenious chemists and food scientists adept at manipulating molecules but they appear to be oblivious to marketing realties. Their erudition does not extend to considering the consumers' reaction to an ingredient label for, for example ketchup, that would read in whole or in part, for example: "Tomatoes, Water, Vinegar, Sugar, 5'-inosinic acid, 5'-guanosinic acid dipotassium orthophosphate, betaine, magnesium chloride hexahydrate, potassium dihydrogen phosphate, dipotassium succinate, dipotassium malate, proteinogenic L-amino acids, L-alanine, L-valine, L-isoleucine, L-phenylalanine, L-tyrosine, L-glutamic acid, L-asparagine, L-methionine, L-pyroglutamine, L-4-trans-hydroxyproline, L-3-cis-hydroxyproline, L-homocysteine, fumaric acid, thaumatin, fatty acid alkamides, cetylpyridinium chloride, and onion powder."

Everything between the ingredient tomatoes and the onion powder would be a problem. Most consumers wouldn't want to wash their hair with it if it constituted shampoo, let alone actually eating it. This is simply a marketing reality. Accordingly one of the world's largest food manufacturers, Unilever, sought via its Open Innovation web portal invitations, but to our knowledge did not find, a salt substitute that would not contain potassium chloride or other chemicals. (https://www.unilever.com/about/innovation/open-innovation/challenges-andwants/less-salt.html)

This is not to say that any of the chemicals in the composed label above, culled from various actual issued patents, are harmful to ingest or even, in some cases, not nutritious. But it is a matter of marketing to consumers. It is a matter of an insurmountable wall of adverse perception. Consumers' fear of chemical-sounding names may be irrational and the professorial designers of these patented substitutes could educate the consumers if they were in their classrooms. But they are not; they are in the supermarket and they will not in large buy such products. The intent to get the general public to cut their excess sodium consumption will not be met if no one buys the products.

Although there is nothing that restricts patents to consumer or commercial use—for example they may involve something for purely scientific or lab use or a process for industrial use—they generally are intended for some form of commercialization and commerce. Because food products are required to bear nutrition labels listing ingredients there is a strong need to make the list sound palatable and to conform to consumers' preference for natural ingredients instead of chemicals and there is a strong preference for known ingredients over unknown ones. Ingredients that are GRAS (Generally Recognized as Safe) are a starting point, with names of natural ingredients that make consumers feel comfortable and not uneasy being the goal.

There are spice blends on the market that combine many spices. Some are marketed as salt substitutes but in fact they taste spicy as opposed to salty. They may taste predominantly like lemon basil or like garlic or a great plethora of spices but generally they do not tact like salt. While some salt-restricted consumers accept the substitution, the suggestion that such blends function as substitutes for salt flies in the face of basics of the science of taste perception.

In this regard it is useful to focus on the distinction of taste and flavor. For example cane sugar has a sweet taste. Honey also has a sweet taste but imparts flavor. Likewise, white vinegar has a sour taste, while balsamic vinegar has a sour taste but also imparts a flavor. A salt substitute or saltiness enhancing mixture should, to the extent possible, have a salty taste while imparting a minimum of flavor.

Of "salt substitute" spice blends, all had a strong spice flavor, with one exception found in a salt substitute published by Joe Ames. (Joe Ames "Low salt non-sweet Thai recipes", recipilink.com, Jan. 6, 1997, 5 pages, pg. 1) This contained onion powder, paprika, thyme, celery seed, garlic powder, dry mustard, and white pepper in a specified proportion of ingredients. Added to a prepared base of ketchup which had a greatly reduced amount of salt and no added sugar or sweetener, it did produce a salty taste without an exaggerated spice flavor. However more sugar had to be added to the ketchup than the typical four grams per serving in leading commercial ketchups, in order to compensate for the essential bitterness of thyme, celery seed and dry mustard. Because reduction of sugar in the diet is of recognized importance, this problem of increased sugar makes this solution not ideal. Also this blend, while minimizing flavor, still imparted more spice flavors than the present invention.

Of the other seventeen recipes of spice blends offered by Mr. Ames' article none can be said to make a pretense of tasting like salt, as opposed to tasting overwhelmingly like various spices. Curry, marjoram, cloves, lemon rind, and other spices do not produce the "gustatory illusion" of salty taste. They are a "salt substitute" in the sense that they can be used in lieu of salt to reduce blandness and to increase flavor, but not in the sense that they produce a taste similar to salt.

A typical serving size is that which is defined by the FDA under Title 21 listing some common serving sizes, or otherwise what commonly prevails on manufacturers' food labels or in the common knowledge of consumers as to what constitutes a single serving of a particular food.

In clearly understanding this it is necessary to consider the imprecision of the English language in the phrase "salt substitute." It can mean two very different things. In the one sense a bowl of fruit or an apple is a "substitute" for an ice cream cone. A very health-conscious parent may say to a child who is screaming for ice cream, "Have this apple. It is a substitute dessert that is better for you." But this does not mean that the apple tastes like ice cream. If, on the other hand, a lower sugar/lower fat/lower salt cheese cake could be made with salubrious ingredients then that would be a "substitute cheese cake" in the exact sense that it tastes like regular cheesecake and perhaps has similar textural and visual properties as well.

In reviewing the background of the prior art, a paramount perspective to keep in mind is that what something is not can be as important as what something is. Another potential salt substitute reviewed, although its author, Chef Emeril Lagasse did not describe it as such but merely by the fictive name "Baby Bam" contains all of the ingredients of the present invention but it additionally contains celery salt, dried thyme, dried basil, and dried oregano. (http:/emerils.com/125947baby-bam; 2 pgs; https:/web.archive.org/web20140617081104htp://emerils.com/125947/baby-bam.) When tested in a prepared ketchup that had no added salt, and tested at an equivalent end amount of sodium per serving as the present invention, approximately 40 mg. per serving of ketchup, the Baby Bam did have a salty taste but not nearly equal to that of the present invention and not equal in saltiness to the average commercial ketchup. Overall it lacked the clean and bright notes expected of a ketchup. Moreover it had a strong spice flavor predominance. While this flavor was good, it would move a ketchup out of the standards of identity for ketchup (https://www.accessdata.fda.gov/scripts/cdrh/cfdocs/cfcfr/CFRSearch.cfm?fr=155.194), or what consumers expect ketchup to taste like, and instead produced a taste like a spicy sauce. When tested directly on sliced, fresh tomatoes it again had the effect of producing a salty taste but overwhelmed by the spicy taste of its component spices. As to a salt substitute in and of itself, outside the base of ketchup, it would be a "substitute" more in the sense in which an apple is a substitute for an ice cream cone.

A low sodium ketchup by Karen Sorenson (EASY HOMEMADE KETCHUP BY KAREN SORENSON, May 30, 2014; 5 pages; http://holistically engineered.com/2014/05/easy-homemadeketchup.html) contained only approximately 49 mg. of sodium per serving. It also contained no added sugar. However it included apple cider vinegar and mustard powder resulting in a bad aftertaste or musty taste and smell, and although somewhat salty in taste was overall predominantly spicy. Adding sugar to this actually reduced the slight taste of saltiness, which therefore did not benefit it, and did not solve the musty or old dirt taste.

Finally a "Daddyo's Raisin Tomato Ketchup" was reviewed. (Daddyo's Raisin Tomato Ketchup, Jan. 29, 2012; 3 pgs. http//www.inthecupboard.com/2012/01/29homemade-raisin-tomatoketchup/). Its author, describing its creation said "inveigle a little steak sauce zestiness into it and then some . . . " and this discloses that tasty as it may be, it does not fall into the traditional profile for ketchup. Indeed it contains cinnamon, cloves, allspice, ginger and orange zest. Nor does its author suggest that this is salt reducing or partially substituting for salt. He simply says to add fleur de sel (sea salt) to taste.

In review of the foregoing there is nothing that has the clean, bright, sharp taste or flavor notes that salt imparts. Rather, either some element of bitterness is introduced as in Joe Ames's "Salt Substitute" which must be offset by adding more sugar than otherwise required, or a complex, heavy spice flavor predominates over the eliciting of a perception of saltiness.

Although there has been an ongoing, intensive search for ways to reduce sodium in foods, for example the Unilever Open Innovation challenge, and guidelines by the F.D.A. and The American Heart Association (https://www.heart.oreen/healthy-living/healthy-eating/eatsmart/sodium/sodium-andsalt?gclid=EAIalQobChMlI56309D44gIVUM-DICh1n4girEAAYASAAEgKykvD_BwE #.Vz9W3-crJ0s), and although health foods have been the increasingly promoted by marketers and purchased by consumers, no satisfactory solution has been found.

Mention should be made of a useful patent by Wang et. al., U.S. Pat. No. 8,900,650, Dec. 2, 2014 which nevertheless has a different operation than the present one. Wang recognized that in table salt it is only effectively the outer surface of the crystal particle that interacts with the saliva and taste buds. Hence large amounts of sodium are consumed which do not, in this use, contribute to the experience of saltiness. By producing nanometer to micro size particles deposited on a substrate, thus increasing the surface area to mass ratio, greater saltiness results using less overall sodium chloride. However in things such as ketchup or tomato based sauces the sodium chloride has been dissolved and suspended, already achieving the maximum possible surface area to mass ratio. It is not possible to have smaller size than single molecules. Accordingly the present invention in a preferred embodiment addresses not the object of reducing the amount of added table salt to foods but the amount of dissolved sodium chlorides in foods, particularly ketchup and tomato based ones. The same distinction and logic applies to U.S. Pat. No. 7,923,047 of Jensen, et. al., Apr. 12, 2011. The reduction of salt achieved by Wang is in the range of 25% to 75%, which at the higher end is comparable to the present invention.

We are not aware of the cost of the process in Wang of producing this but are likewise not aware of its commercial adoption. The present invention, due to the very small quantities needed to effect a salty taste, are exceedingly economical and practical for production. The present invention, unlike Wang, requires no specialized or new equipment, and any food producer could readily adopt its use with no capital investment. The substrates in Wang are GRAS although from a marketing perspective they may not be ideal on a nutrition label for, for example, ketchup, tomato juice, etc. For example: yeast extract, maltodextrin, starch, protein derivative (wheat, soy, whey), gum or flour.

Objects and Advantages

It is impossible to mimic salt in its universal application to foods including sweet, sour, bitter and umami ones. The present natural saltiness enhancing mixture is intended for use with tomato based foods and many vegetables such as lettuce, kale, avocado, fresh peppers, pea pods, green beans, cucumber, mushrooms, broccoli, zucchini, and squash. It also works well with meats and poultry. It does not work with dairy products such as yogurt nor with cereals, granolas, nuts, beverage sodas nor fruits (with the exception that it does work very well with raisin paste used as a sweetener in ketchup). Of two alternate forms of the present invention one is found to work better with a given, particular food than does the other. From this it is noted that its ability to create a salty taste without obvious spice flavor is very dependent on the environment or base to which it is added. For example, neither of the two work on carrots. One works better on fresh tomatoes but the other works better in ketchup. A possible general explanation for this shall be advanced under the Description.

The present invention reduces the amount of sodium per serving by approximately 75%, while yet maintaining an equal perception of salty taste. It does this without increasing the amount of sugar or sweetener needed in the food.

In one preferred embodiment it is applied to tomato ketchup. In another preferred embodiment the saltiness enhancing mixture is combined with one or a combination of tomato based foods, vegetables, meats or poultry such that a typical serving of the food will have approximately 40 mg. of sodium and yet have the perceived saltiness of at least 140 mg. of sodium or will taste adequately salty and without introducing an overwhelming spicy flavor or bitterness.

Insofar as the invention is indeed intended for commercial use, cost is a factor that must be evaluated and considered. The cost to use this saltiness enhancing mixture for example in ketchup would add a couple pennies to the production of a twenty-four ounce bottle of ketchup. Given the superior marketability of so-called health foods and the higher price they command, this extra cost is trivial and non-objectionable.

An object is to provide an excellent salty taste, kick and experience and to enhance the taste when used in such foods. It would not substitute in foods which have a different predominant flavor such as sweet ones like ice cream or soft drinks. A further object is to provide a definite salt taste and not something else, and yet to bring forth a richer, deeper, fuller and, with analogy to symphonic music, brighter brass section notes of flavor. So an object is to provide a salt substitute that tastes better than straight salt when applied to the right foods but which overall registers as "salty."

A typical serving size is that which is defined by the FDA under Title 21 listing some common serving sizes, or otherwise what commonly prevails on manufacturers' food labels or in the common knowledge of consumers as to what constitutes a single serving of a particular food.

An object of the saltiness enhancing mixture described here is to utilize only natural food ingredients and no chemical-sounding ones. The advantage is that in order to truly promote consumer acceptance this is necessary. A definition of the metes and bounds of "no chemicalsounding" names and of "non-chemical" will be given in the Description section and discussed there.

A further object is to utilize commonly known food spices which individually or which in any formerly known combination do not simulate the taste of salt and yet in this saltiness enhancing mixture achieve that surprising result. Although these spices are well known to have good flavors whether used singly or in combinations, an object of the present saltiness enhancing mixture is to combine them in a way that suppresses their known flavors and substantially in the specified combination results in the taste and experience of salt.

The need to reduce sodium in diets is evident. An object of the present salt substitute is to do this in a way that is palatable and does not encounter consumer resistance. In fact the very description of a product as "Low-Salt" or "Reduced Sodium" is a trigger to most consumers to avoid purchasing it. Further it suggests that the food will taste bland or be compromised in terms of ideal taste and flavor. Further, the mental suggestion or association will actually influence in a negative way a consumer's taste perception since food is very subject to suggestion. Master chefs call this "presentation and plating" and this is directly or analogously exactly that. So we teach, preferably, to not present a food product with our salt substitute by marketing "Low-Salt" on the front label but simply to list the ingredients and salt content on the rear label. An object is to present a substitute that fits with the natural and chemical-free quality sought in foods by manufacturers and consumers.

TV Shows such as the Dr. OZ Show, popular health gurus such as Dr. Andrew Weil, and a plethora of TV personalities and hosts and The American Heart Association are all beating this drum loudly of lowering sodium. It is a wave of the future with a lot of present pressure. The trend is there and growing. An object is to align products with this commercial and public health demand.

Logically, given that salt has a strong taste, if it is added to nearly everything in one's diet it will mask the subtle flavors in foods and their distinguishing, individual flavors. Once salt is gradually reduced these flavors, long covered-over, can open to the more discriminating palate. In the meanwhile there is a need to offer substitutes with greatly lowered sodium but not containing other metal halides. An object is to suit this need.

SUMMARY

There is a great and pressing need to find a salt substitute that the public will accept. Prior ones have utilized either potassium chloride which has a compromised and inferior taste or chemicals which have names that are frightening to the public and thus not saleable in a practical sense. There are natural spice blends but they do not simulate the taste of salt, or they introduce bitter notes requiring more sugar than normally needed in the food in order to offset the bitterness. The object and advantage of the present saltiness enhancing mixture is that it overcomes both these problems although it is limited to application to ketchup, related tomato based foods, meats, poultry and many but not all vegetables.

DESCRIPTION

The invention is called a saltiness enhancing mixture because, while it contains a small amount of NaCl salt, its other ingredients work synergistically with that to produce a salty taste that would require approximately 350% that amount of salt added to a food in order to produce an equivalent level of saltiness (or, synonymously, salty taste.) It does not work with all foods, as described below.

The natural saltiness enhancing mixture for ketchup, related tomato based foods and many vegetables, poultry and meats is comprised essentially of onion powder or chive powder and paprika in a ratio of approximately one part ("part" is meant volumetrically here and throughout unless otherwise specified) onion powder or chive powder to two parts paprika, which can be in a range varying from one part onion powder or chive powder to one and a half to three parts paprika to approximately two to fifteen parts of salt. It should be noted that the amount of salt per serving of food to which this is applied will be the same regardless of the range of ratios of one ingredient relative to any other. This means that in the one with a higher ratio of salt, a lesser amount of the onion or chive and paprika is being used. Counterintuitively, the one with a lower ratio of salt tastes saltier. In other words a very small amount of the specified spices potentiates the salty taste. It should be noted that chive powder is a form of onion powder as defined here.

Here and throughout, unless otherwise specified, the term "salt" will refer to sodium chloride. The term "saltiness" refers to the perception of salty taste as opposed to the actual level of salt. "Saltiness enhancing" will mean increasing the level of perceived saltiness. The terms "part" and "parts" refer to volume, not weight unless otherwise specified. Where an ingredient is flaked or in non-compact form, its volume will be taken to refer to it as if it was crushed or powdered or condensed, unless otherwise specified.

Thus the amount of sodium per serving is substantially reduced, while preserving an equal or similar level of salty taste. It is significant that this is done without creating a predominant spicy flavor or increased bitterness.

In an alternative form it is comprised essentially of a combination of garlic, paprika and onion or chive in the approximate ratio of one-quarter to one part garlic to one to two parts onion or chive to one and a half to three parts paprika to two to fifteen parts salt.

The ingredients specified here and below can be in flaked, dried, crushed or powder form. In a preferred embodiment red or Hungarian paprika is used although other varieties of paprika can be used. Quantities specified throughout when stated in fractions of a teaspoon are based on the ingredients in powdered form.

More or less of the saltiness enhancing mixture can be used such that there will be approximately 20 to 80 mg. of sodium per serving of food to which this is added. The amount of salt added to a food to which the saltiness enhancing mixture is added can be higher but at 40 mg. the saltiness enhancing mixture will be perceived as having at least the saltiness of 140 mg. of sodium per serving. In certain foods such a tomato soup which typically have much higher than 140 mg. of sodium per serving, the same saltiness enhancing mixture with its 40 mg. may be perceived as providing sufficient saltiness. Volumetrically 40 mg. of sodium is equal to 0.01739 teaspoons of fine to medium ground salt.

A recipe is merely an artful variation on the ever evolving variety of prepared foods with flavors that will vary to suit individual tastes. However, in the present invention there is a coaction or cooperative relationship or synergy of components producing a new, unexpected and useful result.

The inventor tested the invention with sixteen people, in which were included five world-class food tasting experts plus a sixth expert with expertise in sampling and marketing foods. The president of one of America's leading manufacturers of mustard, ketchup and sauces and his Dir. of Research and Development tested the invention at several sittings. One of America's leading manufacturers of soups, tomato juices and V-8 beverages and other products tested the invention with their Global VP Science & Technology and their Dir. R&E (Research & Evaluation) and their Sen. Dir. S&T (Science & Technology). All routinely perform taste tests. The other ten of the group of sixteen were not experts. Subjects ranged in age from six years to eighty-five years of age, of both sexes, and included teenagers and adults. A leading brand ketchup with 140 mg. sodium was in the blind tested samples in order to provide a reference. In other words subjects did not know which they were sampling.

Without exception all found that the mixtures which had 40 mg. of sodium per serving (slightly more than $1/16^{th}$ of a quarter teaspoon of salt) and in the ratios specified in this specification produced a pleasant, salty taste which seemed equal to 140 mg. of sodium. Comments included: "It has a deeper, richer taste" "It tastes fresher and more natural" "Bright, fresh" "Much better than leading brands" "Saltier than salt" and "Definitely tastes salty." The last comment was a consistent one. (The children said things like "Yum!" or "Good!").

The only divergent opinion was from one of the three experts at the manufacturer of soups and juices. She said that while it had a salty taste, she "thought (she) experienced a slight metallic aftertaste." Her two colleagues disagreed. Of course, unlike with potassium chloride, there is nothing that could possibly contribute any metallic aftertaste. Common metaphorical expressions of an argumentative exchange "leaving a bitter taste in one's mouth" or someone "having an acid tongue" likely have a physiological basis. Prior to the taste testing she had seemed combative. Conversely, she literally hung her head expressing shame that her company produced some products which had nearly a full gram of sodium per serving, which can only be considered to be a public hazard like all such extreme high-sodium products.

The experts persisted in asking how it was done and asking what was the formula, to which of course, no answer was given. Care was taken to remove from the testing table all paper cups and plastic spoons so that nothing could be secreted away for reverse engineering.

When informed that there was only 40 mg. or approximately 28% of the typical amount of sodium they were surprised at the result. Several variations of the ketchup were presented and the one which had raisins substituting for sugar was questioned by one expert to possibly be outside the standard identity for ketchup and more into a salsa or sauce profile. He thought it was very good but questioned the identity. However, reviewing the F.D.A. standard identity for ketchup it falls within the definition and identity. The standard of identity for ketchup allows for a nutritive carbohydrate based sweetener, which raisins are.

The preferred embodiment of ketchup with raisins can alternately be made with sugar with equal grams of sugar per serving. Of course an alternative neutral tasting sweetener such as stevia or any carbohydrate sweetener could be used. In this case the sweetness of the alternative sweetener should match that of the raisin paste as specified.

When the saltiness enhancing mixture is utilized combined with salt in the ratio above stated the resulting sodium per serving of food is reduced to 12% to 75% of the amount typically used in the food product to which it is applied. When a commercially prepared food such as marinara sauce or frozen dinners is particularly high in sodium, the salt substitute of the present invention may reduce the sodium to even as low as, for example, 5% of the prior utilized level. This mixture can in an ideal embodiment replace approximately 75% of the sodium typically added to ketchup, lowering the sodium per serving from the industry standard of 140 to 160 mg. to about 40 mg. Depending on the type of prepared food, the present invention can provide adequate saltiness taste while yet using an amount of sodium chloride that is only 5% to 60% of the sodium of such typical preparations. It provides approximately the saltiness associated with at least 140 mg. of sodium per serving and without adding predominant spicy flavor or adding bitterness. By "saltiness" we mean the perception of the taste of salt and the level or degree of such perception, as opposed to a measure of the actual salt or sodium chloride or sodium per serving content.

In another preferred embodiment, the salt substitute of the present invention can be combined with tomato paste, water, vinegar and raisins to make a ketchup that is very low in sodium, in the approximate amount of 33 mg. per serving, representing over a 75% reduction in sodium compared to leading brands. The sugar in it results solely from the raisins and tomatoes. It is also low being approximately 2.6 g. per serving, compared with 4 g. for leading brands. This is a 35% reduction in sugar. Approximately 0.81 tsp of loose raisins comprising approximately two grams of natural sugar are utilized per serving. The tomato paste contributes approximately 0.6 g. sugar per serving. The naturally occurring potassium from the tomatoes and raisins result in approximately 106 mg. of potassium per serving so that an ideal nutritional ratio of sodium to naturally occurring potassium is achieved. This ketchup has no artificial or chemical ingredients, is rich in lycopene and has much lower sodium and slightly higher potassium than typical commercial brands presently in use. It has a lower glycemic index and has more antioxidants and micronutrients than typical commercially sold ketchups.

In the above described preferred embodiment an approximate one tablespoon serving of the ketchup is made by combining 0.63 tsp of compressed raisins or raisin paste or approximately 0.81 tsp of loose raisins to which it is equal, 1.2 teaspoons of no-salt-added tomato paste, 0.45 teaspoons of white vinegar, 0.75 tsp water, 0.0125 tsp salt, 0.00234 tsp paprika, 0.00117 tsp onion powder or chive powder, and 0.00059 tsp of garlic powder. Equivalent quantities in other forms such as dried, flaked or fresh may be substituted for the powdered concentrated forms. Because measurements of relative parts here is by volume, with ratios volumetrically expressed, if a flaked form is used it would have to be crushed to achieve the measurable equivalent volume, or it could be made equal in weight to the powdered form of the same ingredient.

In one preferred embodiment a tomato ketchup using the saltiness enhancing mixture provides approximately one-quarter the typical levels of sodium per serving in commercially produced ketchups and has a level of salty taste equal to the commercially produced ketchups, and uses only GRAS, non-chemical named ingredients, consisting essentially of a blended mixture of, volumetrically:
  (a) one or more of: one to three parts raisins pulverized to a paste; sugar; stevia; or carbohydrate nutritive sweetener wherein the level of sweetness is equal to the raisins, and
  (b) one to two parts tomato paste, and
  (c) three-eighths to three-quarters parts of vinegar, and
  (d) three-quarters to one and a quarter parts of water, and
  (e) one-quarter to three-eighths part salt, and
  (f) one sixty-fourth to one twenty-fourth part onion powder or chive powder, and
  (g) one sixty-fourth to one twenty-fourth garlic power, and
  (h) one thirty-sixth to one sixteenth part paprika.

In the above embodiment the amount of salt and sugar in the ketchup is substantially reduced while preserving an equal or similar taste of saltiness and sweetness and without a predominant spicy flavor.

In another embodiment the ingredients are volumetrically:
- (a) six and three-tenths parts raisins pulverized to a paste, and
- (b) twelve parts tomato paste, and
- (c) four and a half parts of white vinegar or vinegar, and
- (d) seven and a half parts of water, and
- (e) one-eighth part salt, and
- (f) three-quarters of one-thirty-second part of paprika, and
- (g) three-quarters of one-sixty-fourth part onion powder or chive powder, and (h) three-quarters of one-one-hundred-twenty-eighth part garlic powder.

The 2.6 g. sugar is a 35% reduction in sugar compared to the leading ketchup. Raisins are approximately 60% sugar but contain micronutrients, vitamins and fiber. Four out of five health experts rate them as a healthful food eaten in moderation. (Mandy Oaklander; Time Magazine; Oct. 22, 2015; https://time.com/4082532/dried-fruit-prunes-sugar-raisins/). By comparison refined sugar and high fructose corn syrup are universally rated as unhealthful. By way of an unfortunate loophole that persists in F.D.A. nutrition labeling laws, tapioca syrup is not required to be listed as an added sugar whereas it is nearly all sugar once absorbed into the bloodstream. It lacks other than trivial nutritional value. Accordingly some products are misleadingly sold as having "reduced sugar" or "low sugar" by utilizing tapioca syrup. Comparison of carbohydrate levels would inform the savvy consumer but most lack the knowledge to know to compare in that way. So an advantage of the present preferred embodiment ketchup is that it all of its ingredients are in fact healthful and natural.

In another preferred embodiment a salt and sodium and sugar reduced tomato ketchup provides approximately one-quarter the typical levels of sodium per serving in commercially produced ketchups and approximately two-thirds the sugar per serving and has a level of salty and sweet taste equal to commercially produced ketchups, and consists essentially of a blended mixture of:
- (a) six and three-tenths parts raisin paste, and
- (b) twelve parts tomato paste, and
- (c) four and a half parts of a member selected from the group consisting of white vinegar and vinegar, and
- (d) seven and a half parts of water, and
- (e) one-eighth part salt, and
- (f) three-quarters of one-thirty-second part of paprika, and
- (g) three-quarters of one-sixty-fourth part of onion powder, and
- (h) three-quarters of one-one-hundred-twenty-eighth part garlic powder.

This produces a ketchup with substantially reduced salt and sugar while preserving an equal or similar taste of saltiness and sweetness and without a predominant spicy flavor.

In another preferred embodiment a soup is made using the saltiness enhancing mixture to which is further added, volumetrically:
- a) 1.00 part tomato paste
- b) 0.67 parts olive oil
- c) 4 parts flour
- d) 0.84 parts sugar
- e) 105.84 parts strained tomatoes
    such that the sodium content per serving is approximately 40 mg. to 80 mg. and in which each of the other ingredients "a" through "e" may vary from stated volumes or parts by 25% more or less. A multitude of other spices, flavoring agents or foods such as orange extract, basil, curry, lemon or walnut, may be added but only where such other ingredients do not overwhelm, negate or nullify the salty taste achieved by the ingredients of the saltiness enhancing mixture of onion powder and paprika and salt, or onion powder, paprika, salt and garlic, whether by virtue of being added in relatively trace quantities or by the nature of the added ingredients or where said added ingredients add other flavor notes but do not reduce the salty taste of the combined ingredients specified.

The tomato soup has substantially reduced sodium while preserving an equal or similar taste of saltiness and without a predominant spicy flavor.

The invention can also be described as a method for increasing the saltiness in food, and lowering the typical levels of sodium consisting essentially of:
- (a) adding onion powder to said food, and
- (b) adding paprika to said food, and
- (c) adding salt to said food, and
- (d) adding garlic to said food, and such that a ratio is one part onion powder to one and a half to three parts paprika, to two to fifteen parts salt, to one-half to one part garlic, and such that an amount of sodium per a serving in said food is from 5% to 60% of the sodium of typical preparations, whereby the saltiness is equal to saltiness associated with at least 140 mg. of sodium per serving and without adding predominant spicy flavor or adding bitterness. Alternatively in a variant this method can be applied without the addition of garlic The saltiness enhancing mixture can be used added to prepared foods or in a table salt shaker to use in lieu of straight salt on various foods. Approximately 80% the volume of a pinch of the substitute will have an equivalent taste of saltiness to a pinch of straight salt, yet while having only about 25% of the sodium.

In specifying and describing the invention it is important that naming conventions be understood. It is not what would be commonly called a spice blend in the sense that typically a spice blend will taste like a blend of spices and not like salt. The inventive mixture tastes like salt in the specified environments, that is, with the specified foods.

The ingredients are GRAS (Generally Recognized as Safe) in the food industry and by the F.D.A. The names of the ingredients are non-chemical. (https://www.fda.gov/food/foodingredients-packaging/generally-recognized-safe-gras) This is in contradistinction to numerous patents of salt substitutes which have chemical names.

What is meant by "non-chemical names"? By non-chemical name is meant names commonly known by lay persons as recognizable food substances. Chemical names, on the other hand, would be scientific names used by chemists. Without going into very technical linguistics terms such as term clustering and string similarity, or analyses such as The Oxford Text Corpus examining the frequency of use or popularity of given words, it is sufficient to observe that lay people will readily recognize technical chemical names as being technical chemical names without knowing what they are, whereas they will recognize non-technical or non-chemical names readily and in those cases they will know what they are. So, LS-2509 AC1OA83P 2-amino3-prop-2-enylsulfinylpropanoic acid; 3-prop-2-enylsulfinylsulfanyl-prop-1-ene, the chemical name for garlic, will not be recognized by lay people, whereas the name "garlic" is known to all with a general mastery of the English language. Chemical names are typically polysyllabic, they are often alpha-numeric, that is combining letters and numerals, which non-scientific names do not do, and they observe different rules of construction than non-chemical names.

A technical article "Foreign Language Translation of Chemical Nomenclature by Computer", referenced in this application, dealing with the linguistic morphology and orthography of chemical names will help elucidate a further understanding of the bases, metes and bounds of the term "chemical names" and by the excluded bound, the meaning of non-chemical names. (Roger Sayle; J Chem Inf Model. 2009 Mar. 23; 49(3): 519-530.)

It is clear without further emphasis that a chemical name would be off-putting or scary to a consumer whereas the recognizable food substance name is conventional and acceptable for the very reason that it is recognized. There is not a 100% correlation of buying behavior with this perception however and some products indeed contain a list of chemicals whose names are unrecognizable. The movement to "health foods" and "organic" and simple ingredients capitalizes on the aversion of consumers to such unknowable ingredients which they think (often correctly) may be injurious to their health. Whereas from the 1930's through the 1980's the advertising slogan of "Better Living Through Chemistry" was promoted, a suspicion by consumers of the supposed benevolence of food corporations with their additives and chemicals arose and the health food movement was launched. Medical research and science showed indeed that many additives were unsafe or ill-advised. Accordingly in the current era, long chemical names such as exampled in the Background—Prior Art section, taken from patents for salt substitutes, would generally constitute a marketing dead end or marketing impossibility. Patents should be useful in the real world for which its application is intended. The food labeling laws require the listing of the ingredients. Certain substances with long, chemical names may be harmless but long chemical names will always nowadays be perceived as harmful or potentially harmful by consumers.

Health foods and organic food is the fastest growing segment of the food industry. Despite this trend, a chemical name is not an absolute dead end but it is clearly a negative in terms of marketing. The product Heinz Ketchup No Salt lists an ingredient of Alsosalt® potassium chloride, L-Lysine Monohydochloride. This is targeted to consumers who must restrict their sodium intake. The product name "No Salt" is a technical misnomer and misleading since potassium chloride, of course, is a salt. The misnomer is partially excusable in the sense that consumers equate "salt" with "sodium." Disadvantages to the chemical "potassium chloride, LLysine Monohydochloride" are that it can cause GI adverse reactions such as stomach cramps, diarrhea, nausea, and abdominal pain. (https://www.webmd.com/vitamins/ai/ingredientmono237/lysine) A case report described the development of the kidney disorders Fanconi syndrome and tubulointerstitial nephritis associated with lysine supplementation taken over a 5-year period. (https://www.drugs.com/npc/lysine.html)

Eugenia Killoran, Senior Editor & Writer for The Pritikin Program writes: "Most salt substitutes contain potassium chloride. Brands include Morton Salt Substitute, Nu-Salt, and NoSalt.

Potassium chloride tastes somewhat like sodium chloride (salt), though some people complain of a metallic taste.

"But be cautious about salt substitutes with potassium chloride.

"They can be dangerous if you have certain conditions, particularly diminished kidney function, which is fairly common among older people in the U.S., or if you take certain hypertension medications, including ACE inhibitors and potassium-sparing diuretics.

"So yes, the very same people who might be looking for salt substitutes—those with hypertension (high blood pressure)—are the ones who probably ought not to be using salt substitutes with potassium chloride." (Eugenia Killoran; "Are Salt Substitutes Safe?" (https://www.pritikin.com/your-health/healthy-living/eating-right/salt-substitutes-safe.html) Another disadvantage of Alsosalt® is that it sells for approximately twenty-six times the cost of regular salt. Likewise, Heinz No Salt Added Ketchup sells for approximately two and a half times the cost of regular Heinz Ketchup. The present invention, due to how much it enhances and amplifies or works synergistically with salt, requires such little quantity that the retail cost increase of a bottle of ketchup would be under five cents.

While some consumers posting comments in Amazon reviews have a very positive reaction to the taste of Alsosalt® as a stand-alone product and in the Heinz No Salt Added product, they do so with an understanding of the compromise imposed by their medically salt restricted diet. Other consumers post highly negative reactions to the taste. Others simply say they do not want to ingest chemicals, reacting to the chemical name they read on the nutrition label.

The English language is not precise. It is not like mathematical terms or formulas. For example approximately twenty-eight or so pages of the Oxford Dictionary of the English Language is dedicated to its definition of "or". "Or" can have a conjunctive or a disjunctive meaning, so it can sometimes mean "and" and sometimes "not and." In legal contracts the term, often used, would therefore be often ambiguous. This general imprecision of the English language presents a challenge in the present instance. The phrase "salt substitute" is altogether misleading.

As previously mentioned, it could "substitute" in the sense in which an apple is a substitute for an ice cream cone. But some authors of such recipes may indeed have intended the other meaning, namely that it will taste like salt without changing the food identity or ruining or worsening the expected flavor, or otherwise requiring the addition of excess sugar. If so they have all failed. It is for that reason that the present invention is useful and unobvious.

What something is not is as important as what something is. Beethoven's famous four notes if mixed with twenty other notes in a random order would altogether lose their profound, resonant and memorable meaning they obtain when isolated to just the four notes just as Beethoven would have them. Again, if an automobile engine as previously known has ten necessary elements and an inventor has figured out how to make it instead with nine, that is a new invention.

Of course no one would infringe by simply using onion and paprika and a small amount of salt in a prepared food. They would do so only if they added these in the specified range of ratios and in the absence of many other things which render these components inoperative for the purpose of simulating a salty taste. The specified components are co-active and synergistic in a non-obvious way, which is why, despite a salt-reducing solution being so long and highly sought, no prior art achieved it.

In the present case it is a new use of onion and paprika but they only have their operation in the absence of many things which have always seemed to be used with them, namely a plethora of other spices. That, or a high level of salt, nullifies their effect.

While we don't wish to be bound by a theory of operation, the reason that we believe this salt substitute is limited to certain foods is that flavor and taste are relative to predominant background flavors. Using the usual analogy of food taste to music, notes played on a fuzz-tone electric guitar that would sound perfectly excellent in a Beatles or Rolling Stones song would sound out-of-place in a classical Spanish guitar composition.

The spices can be in finely ground flakes or crushed or powder form. They are typically thoroughly mixed and uniformly distributed throughout any prepared or prepackaged food. Alternatively they may be applied more to the surface or top of a food than throughout. Alternatively they may be used as a table seasoning to be applied to foods including homeprepared ones.

The spices are simply a mixture and we are not familiar with any chemical reaction. It should be noted that ketchup is made from tomato paste or puree that is already cooked. Again not wishing to be bound by a theory of operation it is our belief that the salt taste that results from the combination can be likened analogously to another known psycho-physical reaction involving sight. Using only black and white colors, for example projected on a black and white TV monitor, given a certain and exact frequency of alternating the black and white, and a given invariant background, virtual colors will appear. Likewise from a black and white Moiré pattern, such virtual color can appear. We believe that analogously, involving the gustatory calyculi and taste perception senses of the brain, that the particular, relatively exact combination of ingredients of the present saltiness enhancing mixture creates a virtual experience of the taste of salt in the context of certain food bases. Just as the alternating frequencies of black and white that at a particular ratio and rate cause the virtual color perception must play against a steady background, so the present saltiness enhancing mixture must be used with tomato based foods and other certain foods in order to taste like salt and not have a spice taste.

Additionally, to achieve the surprising effect of equivalent level salt taste the saltiness enhancing mixture must be in a limited range of values of quantity relative to the given food. If too little is used the effect will not occur. If too much is used the effect will not occur and instead the ordinary spice tastes of the components will be evident. The right quantity results in a preferred embodiment when approximately one part of onion or chive powder by volume is combined with approximately two parts of paprika. This is combined with two to fifteen parts of salt. Alternatively this may be combined with 0.012 to 0.006 teaspoons of garlic powder. Alternatively this can be combined with 0.0004 to 0.002 teaspoons of black pepper. These quantities can vary by 20% more or less from the stated ranges and be in the effective preferred quantities.

Accordingly spices that have been in use for many thousands of years and combined in multiple ways and in innumerable recipes have not in prior art or use been specified in the precise ratios and combination to one another and quantity all together in use relative to the food base quantity to which it is added and which must be restricted to certain tomato based foods and other foods. Despite the search for a natural salt substitute or saltiness enhancing mixture being a long and intensive one, this surprising result from the combination of these very ordinary ingredients was not previously shown.

The term "saltiness enhancing mixture" is meant here as something which if added to a food will reduce the amount of salt generally used with that food while yet maintaining the perception of an equal amount of salty taste, and without overwhelming flavor notes.

To the end of more fully understanding the way in which the virtual gustatory illusion or experience of salty taste arising from non-salt components occurs, it is well to consider the use of the term "consisting essentially of" not merely as a transitional phrase in a patent application but as a description in the specifications. Using the optical illusion analogy, the illusion may work if viewed within so many degrees of subtended angle but collapse outside of that. So too, the salty taste will be only present in the presence of certain ingredients and, at the same time, in the absence of other ones. If other ingredients are added which, relative to the volume of the main ingredients are so small that do not materially affect the unique operation and synergy of the specific "consisting of" ingredients, then they will not negate the operation of the invention. In the cited known recipes and other known spice mixtures these other ingredients are not very small relative to the specified ones but instead are significant, equal or large and accordingly they act to eradicate the unobvious result of salty taste which does not have predominant spicy flavors. Accordingly we can say that the invention consists essentially of the specified ingredients, meaning to exclude other ones unless in insignificant amounts. This is within the defined purpose of creating a salty taste without an overriding spicy flavor. This however is not negated by adding other food flavors or components which bear a distinct flavor and don't interact so as to destroy the operation of the invention.

For example if one was preparing a chicken dinner or a ketchup and wished to make a currychicken or a curry-ketchup with reduced salt, the addition of such a distinctive flavor component might not interfere with the operation of the saltiness enhancing mixture. The salty taste might not be eradicated or interfered with, or it might be, depending on the particular component added. We know that adding a plethora of other spices will definitely destroy the sought effect. But as to a particular added distinct flavor, it might not. If one prepared a currychicken, for example, the curry might allow the present invention to operate and yet of course add a curry flavor. The neutrality of flavor and predominance of salty taste would be lost but in this example it would be by intention. So, if adding to the essential ingredients a food component not specified here which resulted in destroying the operation of the invention then that is what is excluded. But if adding another food component did not destroy the operation and merely added an unrelated, distinct flavor, then that would be the present invention. It would be a non-essential addition. Such a mixture would have a more restricted scope of application as a saltiness enhancing mixture since it would no longer be applicable to a wide class of tomato based foods, nor to vegetables nor to meats and poultry other than curry dishes. A multitude of other spices, flavoring agents or foods such as orange extract, basil, curry, lemon or walnut, may be added, but only where such other ingredients do not overwhelm, negate or nullify the salty taste achieved by the ingredients of onion powder and paprika and salt in the specified ratios, or of onion powder, paprika, salt and garlic in the specified ratios, whether these additional ingredients by virtue of being added in relatively trace quantities or by the nature of the added ingredients or where said added ingredients add other flavor notes but do not reduce the salty taste of the combined specified ingredients. In such cases they do not materially affect the operation of the specified ingredients.

By analogy to the invention of the bicycle, it would be adding a radio hanging on the handlebars. If, on the other hand a new invention was made with fewer ingredients than the present essential ingredients and still produced a salty taste free of predominant spice flavor, that would be a new invention. Likewise an invention using entirely different ingredients than the specified essential ingredients, and which produced a salty taste free of predominant spice flavor, would of course be a distinct invention.

As in an oil painting by a master artist it is discovered that the "magical" effect of light or color that emanates from the canvas was the result of great technical detail, for example mixing the pigments with the right oils, not muddying the color by adding an extraneous one, and by using finer brushes in the ultimate layer than were used in the base layers, so in the present invention the use of ordinary things results in an effect highly dependent on precise specification to achieve the surprising result.

Again, not wishing to be bound by a theory of operation while it may seem intuitive that a sensory perception of a phenomenon would change in a linear way with the change in intensity or quantity and would not change in quality, there are many instances of analogues in natural science of such stepped or bounded changes in quality. For example increasing the temperature of ice up to thirty-two degrees Fahrenheit changes nothing in the nature of the ice except its temperature. Then a sudden phase change occurs where it changes to water which has entirely different physical properties which could not have been predicted based on observation of the prior phase state. These qualities persist while temperature rises to the phase change point of two hundred and twelve Fahrenheit. If ice became water in the first change as a result of raising the temperature, it does not become more watery as the temperature is raised nor does it in fact remain water above a certain point. A graph of $H_2O$ through rising temperature and phase state shows that there is no temperature change during phase transition until it is complete. It also shows that water exists discretely between two temperatures. In an analogous manner the salt taste from the combination exists only between discrete levels of intensity measurable as a quantity per serving within defined limits relative to a background of certain foods.

Again, not wishing to be bound to a particular theory we believe that yet a further explanation of the operation of this invention resulting in an unexpected outcome from a particular combination of previously widely known ingredients is that food or spice flavors are not merely additive but also subtractive. The flavor of any given food, for example of garlic, can be portrayed as at least a five dimensional differential. These dimensions would include sweet, salty, sour, bitter, and umami. Additional dimensions recognized by some food scientists and in some cultures include pungency, coolness, astringency, and fattiness. Although known mechanisms exist for the major tastes, and it is theorized that subclasses of the major categories account for differences in taste it is possible that other mechanisms also exist. Taste (gustation) combined with smell (olfaction) and texture (trigeminal nerve stimulation and mechanoreceptors) generally combine to create our sensation of the food.

So a given food may be portrayed as occupying some portion of a universe comprised of these dimensions, or as extending more or less into each dimension and thus having a particular or differential mapping in the space. While it would be most common to think of tastes as additive, for example something sweet like sugar added to something sour like lemon would be expected to produce a sweet and sour candy, it is also true that some flavors are subtractive. Salt will reduce the perception of bitterness. Lemon is added to fish to counteract very slight or fine elements of putrefaction where the fish is not perfectly fresh. Sugar is added to vinegar to so-called cut the sourness of the vinegar. Although sugar does not significantly alter the pH of the solution or mixture with the vinegar yet it has this effect, proving that taste perception is subjective and not fully described by chemical reactions. This is so because the sourness of vinegar arises from its acidity which is not altered but the perception of sourness is altered.

Accordingly, and not wishing to be bound by any theory, per the theory described certain tastes or certain components of tastes or perceived extension into the various dimensions of the space defining taste may add or cancel one another, similar to wave phenomena. Thus by analogy this is similar to subtractive color perception. Likewise certain flavors or components of tastes in certain dimensions of the space defining taste may reinforce one another. Accordingly, just as it would be surprising to someone who had never seen the secondary colors to see green emerge from the combination of primary yellow and blue, or to see green result from combining gold and black color, so the emergence of a salty taste from components which individually do not directly or primarily exhibit this taste is of course surprising.

Clearly there is a strong demand to find a non-chemical salt substitute or saltiness enhancing mixture that is salt reducing and that would have a great taste and no aftertaste. Hunt's offers a no-salt, no-sodium ketchup. It contains garlic and onion. Yet the product is perceived by most as bland tasting, based on reviews published. The product is intended for those on a medically restricted diet who must accept the compromise of bland taste in exchange for a more healthful product. If the two commercial giants Heinz and Hunt's had known the present invention they certainly would have used it to make a better and more appealing product and to improve their other ketchup products by lowering sodium, which is an identified national priority for the food industry. Despite this intensive search and the fact that the components have been in use for thousands of years, the combination of the particular ingredients and in the ratio and quantities specified in the present invention gives the unexpected solution of the problem.

Another way to analogously understand this is to consider that if you are too far or too close to something you cannot see it. Likewise, in the case of this saltiness enhancing mixture, using too little or too much relative to the food serving to which it is applied will not focus the perception on the salty impression.

Insofar as saltiness is directly the perception of sodium ions via ion channels any simulation of saltiness is the taste equivalent of a visual optical illusion. The texture of the powdered onion, garlic and paprika and the additive and subtractive flavor differentials at just the right ratio and quantity relative to a food so treated seem to account for the production of the illusion. However this is highly dependent on the food base to which it is applied. The reasons for this are not presently known. Insofar as taste is also subjective it is not an illusion but a direct experience of saltiness from a mixture which either has no sodium or alkali ions or a very low amount of them.

We generally observe that the two alternate forms of the invention work excellently in a mildly acidic environment and in an umami one but not in a sweet one unless the sweetness is counterbalanced by acidity, for example ketchup. The one consisting essentially of onion and paprika will work acceptably in a bitter environment such as radishes. It will work well in a mildly salty environment such as a food serving with 40 mg. of sodium per serving but not in a highly salty one since overly high salt taste is perceived as unpleasant.

To fully and clearly describe what the saltiness enhancing mixture is, it is important for us to also explain what it is not. It is not more components or ingredients than those claimed. The unexpected result occurs only when not combined with the addition of other spices, at least in significant quantity. Referring again to the typical analogy of flavor to music, Beethoven's Fifth Symphony starts with a sequence of four notes that are very famous. He interpreted them in words as "Thus Fate knocks at the door." We have all heard this famous sequence of notes. In hindsight it may seem obvious to us. It certainly seems natural. Someone could say, "I could have written that." Having heard it, that is true. But in fact it was not obvious until Beethoven's genius brought it forth. It perhaps resonates with something deep in our genetic core. Beethoven did not invent the notes. Those were known. He did not invent the idea of music or the idea of arranging notes and chords in a sequence or combination. It was his particular choosing of those notes in that order, with expressions of loud or soft and fast or slow that created the unique thing that will be remembered in music for all time. Just as Beethoven chose four notes from a range of many notes, a great constellation of notes in which those four happened to occur would not be what he created.

Great chefs, like great musicians, have an advanced sense making them capable of intuiting and then experimenting, testing and perfecting certain combinations. Our saltiness enhancing mixture is just that for a saltiness enhancing mixture limited to a background of certain foods. If the same ingredients, even if in a similar ratio were included in a combination of many other spices it would not result in the same effect. If the ingredients were used by themselves but in a substantially different ratio than the range specified it would not have the same effect, or would to an increasing degree fall off to a lesser performance of providing a satisfying salt substitute. However if someone desired to flavor a food with a saltiness enhancing mixture and to also give it some other flavor, for example orange extract, or walnut, then the present saltiness enhancing mixture can be utilized and will preserve its integrity and use, while other flavors can be added according to the recipe of any chef. Thus, a multitude of other spices, flavoring agents or foods such as orange extract, basil, curry, lemon or walnut, can be added but only where such other ingredients do not overwhelm, negate or nullify the salty taste achieved by the ingredients of the saltiness enhancing mixture whether by virtue of being added in relatively trace quantities or by the nature of the added ingredients or where said added ingredients add other flavor notes but do not reduce the salty taste of the combined ingredients of onion or chive and paprika and a small amount of salt or of the combined ingredients of onion or chive, paprika, garlic and a small amount of salt.

Finally, If the ingredients in the specified ratio were used but in the wrong quantities either too much or too little per food serving, the sense of salty taste would disappear.

The Inventor has done his best diligence in trying to give the theories of operation as to why the invention works, and those sections of the Specification probably add to the state of the science in this area. Of note is the fact that many published recipes contain all of the ingredients of the present invention, but by virtue of containing many other ingredients they effectively cancel out the surprising and effective result of the present invention. An analogy was given to Beethoven's famous four notes of his Firth Symphony and the fact that if those same four notes were thrown in with a whole bunch of other notes the "mixture" or "recipe" would not contain the profundity and soulful depth of Beethoven's signature. In plain, the many recipes published with the misleading titles of "salt substitute" do not achieve a taste anything like salt. Salt has a taste that is neutral in regard to some other dimensions of flavor. Other spices are plant based. Salt is not. It is a metal halide. That it is possible to combine onion and paprika and get a salt flavor and sensation, but only in an environment of tomato based foods such as ketchup, tomato sauce, tomato juice, tomato soup, salsa, and other sauces and in an environment of many but not all vegetables and one of meats and poultry is an interesting result. The addition of small amounts of other spices, flavoring agents or foods, where the amount is very small relative to the onion and paprika, and where the nature of those added ingredients does not negate, overwhelm or nullify the effect of the onion and paprika in producing the salt simulating taste, is permissible.

By whatever fortuity, device, intuition or insight the Inventor was able to employ, he discovered the result and invention which was not obvious to anyone. It may exemplify the expression "Less is More" because from a seething mass of spices whose mixtures only produced a spicy tasting concoction tasting nothing like salt, the Inventor extracted just the two or three ingredients, which combined in the right ratios relative to one another and relative to the particular food environment, did indeed produce a salty taste. There is great utility in this and if utilized commercially it will promote the public health.

Operation of Invention

The mixture described above provides a means to make certain foods taste salty, while using much less salt than typically used. The method is straightforward and involves simply adding the mixture to the food, typically uniformly distributed through a viscous substance such as a sauce or condiment or sprinkled on a meat or vegetable.

Given that the ingredients are in dry form they have a low micro plate count. Their pH falls within a normal range. They have nutritious elements and have antimicrobial properties.

CONCLUSION, RAMIFICATION AND SCOPE OF INVENTION

Thus the reader will see that the saltiness enhancing mixture of the invention provides an easy-to-produce, economical and practical solution to the strong market and public health demand to offer a chemical-free substitute to high salt/high sodium additions to foods, although limited to application to certain foods.

While our above description contains many specifications these should not be construed as a limitation on the scope of the invention, but rather as an exemplification of one or more preferred embodiments thereof. Many other variants are possible. For example the ingredients can be prepared in a paste form or a fresh form as opposed to dried flakes or powder. Where the base food to which the substitute is applied already contains, whether naturally occurring or by addition, one of the specified ingredients the mixture can be prepared reducing or eliminating that ingredient so long as the resulting food serving overall preserves roughly the specified ratio of ingredients.

Variations from the preferred embodiment may involve substitution of variants such as white pepper for black pepper. Ingredients may be added cold or hot.

Accordingly, the scope of the invention should be determined not by the embodiment(s) but by the appended claims and their legal equivalents.

The invention claimed is:

1. A saltiness enhancing mixture for use with tomato based foods, vegetables, meats, and poultry consisting essentially of:
(a) onion powder or chive powder,
(b) paprika,
(c) salt,
wherein (a), (b) and (c) are core ingredients that are mixed together in a ratio volumetrically of one part onion or chive powder to one and a half to two and a half parts paprika, to two to fifteen parts salt, adding the saltiness enhancing mixture to a first food serving that only adds from 20 to 80 mg of sodium to achieve a first saltiness, whereby achieving the first saltiness would require at least 140 mg of sodium, if the saltiness enhancing mixture was replaced by NaCl only, and wherein the saltiness enhancing mixture produces the first saltiness without adding predominant spicy flavor or adding bitterness, and wherein other spices or flavoring agents may be present only in trace quantities so as to provide flavor notes but without reducing the first saltiness of the said mixture of core ingredients.

2. The saltiness enhancing mixture of claim 1, wherein the first saltiness is achieved in a serving of food consisting of one or more selected from the group of tomato based foods, vegetables, meats, and poultry, such that the serving of food with saltiness enhancing mixture has 14% to 60% of the sodium in said serving as compared to the serving of same food with NaCl only.

3. The saltiness enhancing mixture of claim 1, wherein said other spices or flavoring agents one or more selected from the group consisting orange extract, basil, curry, lemon and walnut so that the effect of said other spices or flavoring agents is to not overwhelm, negate or nullify the salty taste achieved by the core ingredients by virtue of said other spices or flavoring agents being added in relatively trace quantities.

4. A saltiness enhancing mixture for use with foods consisting essentially of:
(a) onion powder or chive powder,
(b) paprika,
(c) salt,
(d) garlic,
wherein (a), (b) (c) and (d) are core ingredients that are mixed together in a ratio of one part onion powder to one and a half to two and a half parts paprika, to two to fifteen parts salt, to one-half to one part garlic,
whereby adding the saltiness enhancing mixture to a first food serving provides 20 to 80 mg of sodium to achieve a first saltiness, whereby achieving the first saltiness would require at least 140 mg of sodium, if the saltiness enhancing mixture was replaced by NaCl only in said first food serving and wherein said saltiness enhancing mixture produces the first saltiness without adding predominant spicy flavor or adding bitterness and wherein other spices or flavoring agents may be present only in trace quantities so as to provide flavor notes but without reducing the first saltiness of the said mixture of core ingredients.

5. The saltiness enhancing mixture of claim 4, wherein a first saltiness is achieved in a serving of foods one or more selected from the group consisting of tomato based foods, vegetables, meats, and poultry such that the serving of food with saltiness enhancing mixture has 14% to 60% of the sodium in said serving as compared to the serving of same food with NaCl only.

6. The saltiness enhancing mixture of claim 4 wherein said other spices or flavoring agents are one or more of the group consisting orange extract, basil, curry, lemon and walnut, so that the effect of said other spices and flavoring agents is to not overwhelm, negate or nullify the salty taste achieved by the core by virtue of said other spices or flavoring agents being added in relatively trace quantities.

7. A saltiness enhancing mixture for use with foods consisting essentially of:
(d) onion powder,
(e) paprika,
(f) salt,
said members mixed together in a ratio volumetrically of one part onion powder to one and a half to two and a half parts paprika, to two to fifteen parts salt;
whereby adding the saltiness enhancing mixture to a food serving to achieve a first saltiness that only adds 20 to 80 mg of sodium, and is an amount of sodium that is only 14% to 60% of the sodium that would produce said first saltiness which would require at least 140 mg of sodium if the saltiness enhancing mixture was replaced by NaCl only.

8. A saltiness enhancing mixture for use with foods consisting essentially of:
(e) onion powder,
(f) paprika,
(g) salt,
(h) garlic,
said members mixed together in a ratio of one part onion powder to one and a half to two and a half parts paprika, to two to fifteen parts salt, to one-half to one part garlic,
whereby adding the saltiness enhancing mixture to a food serving to achieve a first saltiness that only adds 20 to 80 mg of sodium, and is an amount of sodium that is only 14% to 60% of the sodium that would produce said first saltiness which would require at least 140 mg of sodium if the saltiness enhancing mixture was replaced by NaCl only.

* * * * *